United States Patent [19]

Price

[11] Patent Number: 5,040,628
[45] Date of Patent: Aug. 20, 1991

[54] MAINTENANCE COVER FOR AN ENGINE COMPARTMENT

[76] Inventor: Jeffrey A. Price, 2318 W. Cleveland Rd., Perrington, Mich. 48871

[21] Appl. No.: 643,345

[22] Filed: Jan. 22, 1991

[51] Int. Cl.⁵ .............................................. B62D 25/10
[52] U.S. Cl. ............................ 180/69.21; 180/69.24; 180/89.17; 180/313; 123/195 C
[58] Field of Search ................... 180/69.1, 69.2, 69.21, 180/69.22, 69.24, 84, 89.17, 313; 123/195 C, 198 E; 150/157

[56] References Cited

U.S. PATENT DOCUMENTS

| | | | |
|---|---|---|---|
| 3,112,810 | 12/1963 | Nallinger | 123/198 E X |
| 4,137,983 | 2/1979 | Gray | 180/69.24 |
| 4,141,427 | 2/1979 | Kirchweger et al. | 180/69.22 |
| 4,143,733 | 3/1979 | Morello et al. | 180/69.24 |
| 4,455,971 | 6/1984 | Kirchweger et al. | 123/198 E X |
| 4,623,186 | 11/1986 | Chavarria et al. | 180/313 X |
| 4,644,915 | 2/1987 | Afshar | 123/142.5 R |
| 4,890,584 | 1/1990 | Tamba et al. | 123/195 C X |

*Primary Examiner*—Andres Kashnikow
*Assistant Examiner*—Brian L. Johnson
*Attorney, Agent, or Firm*—Charles W. Chandler

[57] ABSTRACT

A rigid maintenance cover is mounted under the hood, on top of the engine of an automotive vehicle. The cover protects the user while checking various fluid levels, such as the oil, brake fluid, and so forth. The inlet ends of the various conduits for checking such fluids extend above the cover.

7 Claims, 1 Drawing Sheet

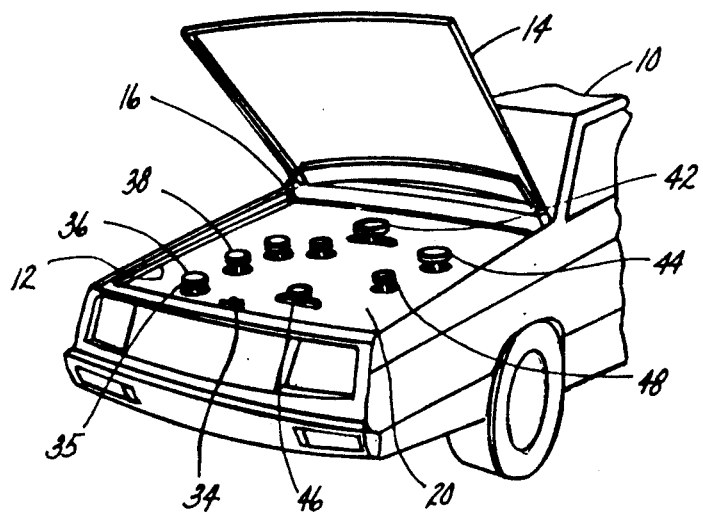
fig. 1
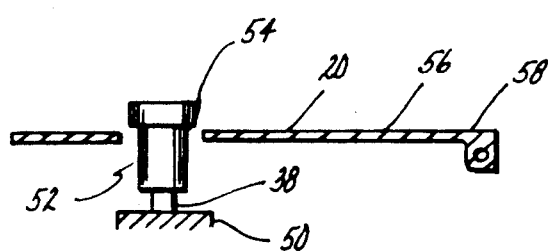
fig. 2
fig. 3
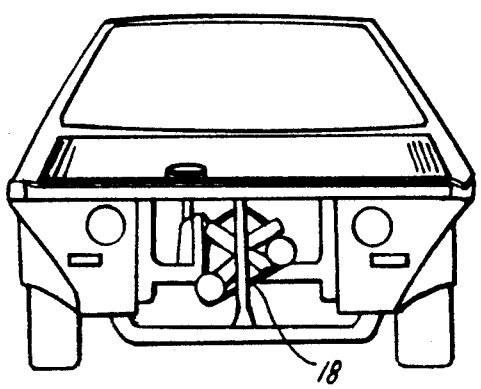
fig. 5
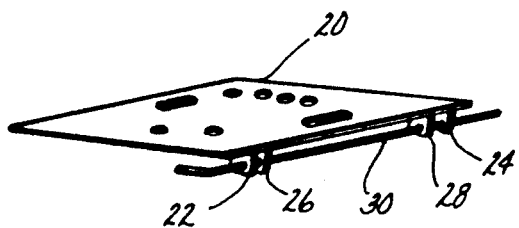
fig. 4

MAINTENANCE COVER FOR AN ENGINE COMPARTMENT

BACKGROUND OF THE INVENTION

This invention is related to a maintenance cover for protecting a user who is checking various fluid levels of an automotive engine. Typically, checking various fluid levels, such as brake fluid, radiator coolant, and lubricating oil, is a relatively messy job because these liquids frequently drip onto the engine. The user then, upon coming into contact with the liquids, tends to soil his clothes.

Some covers are known in the prior art which are draped over an engine in order to retain heat during cold weather. One such cover is illustrated in U.S. Pat. No. 4,644,915 which issued Feb. 24, 1987 to Bahram Afshar. However, such a device must be removed from the engine in order to check the fluid levels.

SUMMARY OF THE INVENTION

The broad purpose of the present invention is to provide a cover that may be mounted on top of an engine, beneath the hood of an automotive vehicle. The cover covers the entire engine compartment of the vehicle. It is removable to permit access to the engine. Each of the various fluid dipsticks or conduits such as the oil conduit, the brake fluid cylinder and the radiator filler conduit, extend through openings in the cover so as to be accessible without removing the cover from the engine. In some cases, extensions may be mounted on the fill tube outlets to extend above the cover. For example, the oil filling conduit may be extended above the cover. In other cases, the cover can be formed with recessed portions to accommodate the level of the particular conduit.

When the cover is in position on the engine, the user can readily check or refill a particular fluid without coming into contact with a messy engine. The cover can be either mounted in position so as to be trapped o top of the engine when the hood is closed, or it can be hingedly mounted to the vehicle adjacent the engine compartment so that it can be raised or lowered independently of the hood.

The cover permits the automatic transmission fluid level to be ascertained with the engine running. The cove prevents the user from being burnt from the heated engine. The cover also prevents cooling fan accidents because some modern vehicles have cooling fans that are energized after the engine has been turned off.

The cover prevents stains on good clothing when checking maintenance levels.

Further, labeling can be provided adjacent the upper ends of the various liquid fill tubes to avoid the necessity for searching for the maintenance schedule for various fluid systems.

Still further objects and advantages of the invention will become readily apparent to those skilled in the art to which the invention pertains upon reference to the following detailed description.

BRIEF DESCRIPTION OF THE DRAWINGS

The description refers to the accompanying drawings in which like reference characters refer to like parts throughout the several views, and in which:

FIG. 1 is a fragmentary perspective view showing the preferred maintenance cover in position;

FIG. 2 is a view showing the cover removed from the engine;

FIG. 3 is an enlarged sectional view showing how washer fluid fill tube conduit is extended above the cover with the cap mounted on the upper end of the extension;

FIG. 4 is a view of a hinge means for mounting a cover on the vehicle; and

FIG. 5 is an elevational view showing the manner in which the cover is mounted above the engine.

DESCRIPTION OF THE PREFERRED EMBODIMENT

Referring to the drawing, FIG. 1 illustrates an automotive vehicle 10 having a conventional engine compartment 12. A hood panel 14 is pivotally mounted by conventional hinge means 16. The hood panel, as is customary, closes-off the top of the engine compartment when the vehicle is in use.

A conventional engine 18 is mounted in compartment 12, as illustrated in FIG. 5.

A maintenance cover 20 or panel is mounted in the engine compartment. Maintenance cover 20 has width and length dimensions chosen so as to substantially close off the engine compartment above the engine. The cover is mounted between the engine and the hood. For illustrative purposes, cover 20 has a pair of hinge members 22 and 24, as best illustrated in FIG. 4. These are mounted adjacent the rear edge of the cover. A pair of cooperating hinge members 26 and 28 are attached by a high-strength adhesive to the cover for mating engagement with the vehicle adjacent the rear edge of the engine compartment so that the cover can be raised and lowered.

Hinge rod 30 is passed through aligned openings in hinge members 22, 24, 26 and 28 so that the cover can be raised and lowered in a manner similar to the hood, but independently of the hood motion. The rod can be pulled from the hinge members so that the cover can be removed from the engine compartment. In some cases, the cover may not be hingedly connected to the vehicle, but can be formed so as to be trapped beneath the hood and on top of the engine when the hood is closed.

Referring to FIG. 2, the forward edge of the cover has a notch 32 for engaging the hood-latching mechanism 34, see FIG. 1.

The cover has eight openings for accommodating respectively, radiator conduit 35, an engine coolant conduit 36, a washer fluid fill tube 38, a power steering fill tube 40, transmission fluid dip stick 42, a brake fluid conduit 44, an engine fill tube 46 and an engine oil dip stick tube 48.

Each of the fill tubes has an appropriate cap, which as is well known to those skilled in the art, is removed to permit the particular fluid to be introduced into the engine.

Referring to FIG. 3, the washer fluid fill tube 38 is illustrated as extending upwardly from a washer fluid tank 50. Because engines are usually built so that the fill tubes do not extend to a common height above the engine, an extension tube 52 is illustrated mounted on the upper end of fill tube 38 so that cap 54, mounted on the upper open end of the extension tube, is above the upper surface of cover 20. Similar extension arrangements are provided for each of the other fill tubes, whether it be oil, brake fluid or the like. To accommodate these various fill tubes, the cover has a corresponding openings 35A, 36A, 38A, 40A, 44A, 46A and 48A, as best illustrated in FIG. 2.

Cover 20 can be formed of a composite material such as a fiberglass core 56 encased in a rigid plastic envelope 58 to replace the conventional insulation and sound-absorbing material customarily mounted on the underside of the hood.

The cover can be formed with recessed areas to accommodate fill tube openings that open below the engine top.

Having described my invention, I claim:

1. A maintenance cover for use beneath a movable hood of a vehicle having an engine compartment, and an engine disposed in the engine compartment, the engine having an upper surface and having a fluid checking conduit for ascertaining and raising a level of an engine related fluid as needed said maintenance cover comprising:
    a removably mounted panel disposed in the engine compartment between the hood and the engine, the panel being relatively rigid so as to be movable as a unit independently of the hood, the panel being disposed on a generally horizontal plane above the engine as the hood is being either raised to permit access to the panel, or lowered to close the engine compartment, the panel covering substantially the entire upper surface of the engine; and
    the panel having an opening disposed adjacent the fluid-checking conduit such that the fluid level in the engine may be checked through the conduit while the panel remains disposed in the generally horizontally plane above the engine.

2. A maintenance cover as defined in claim 1, in which the fluid has a cap mounted on the conduit, and the conduit is disposed such that the cap is above the cover.

3. A maintenance cover as defined in claim 1, in which the engine has a dip stick with a handle disposed in the fluid checking conduit, the conduit having a length such that the dip stick handle is disposed above the cover.

4. A maintenance cover as defined in claim 1, including a conduit extension mounted on the conduit, the extension having an upper open end disposed above the cover.

5. A maintenance cover as defined in claim 1, in which the panel has structure for engaging a latching mechanism of the engine compartment.

6. A maintenance cover as defined in claim 1, including hinge means pivotally connecting the panel to the vehicle such that the panel may be pivotally raised to provide access to the engine.

7. A maintenance cover for use beneath a movable hood of a vehicle having an engine compartment, and an engine disposed in the engine compartment, the engine having an upper surface and having a fluid checking conduit providing access to a engine coolant system, and a conduit having a dip stick for asserting a level of oil in the engine, the cover comprising:
    a removably mounted panel disposed in the engine compartment between the hood and the engine, the panel being relatively rigid so as to be movable as a unit independently of the hood, the panel being adapted to be disposed in a generally horizontal plane above the engine as the hood is being either raised to permit access to the panel, or lowered to close the engine compartment, the panel covering substantially the entire upper surface of the engine; and
    the panel having an opening disposed adjacent the fluid-checking conduit such that a fluid level in the engine may be checked through the fluid checking conduit while the panel remains disposed in the generally horizontally plane above the engine.

* * * * *